July 21, 1970  D. W. OHLRICH  3,520,987
HIGH CAPACITY BUS BAR
Filed Aug. 5, 1968
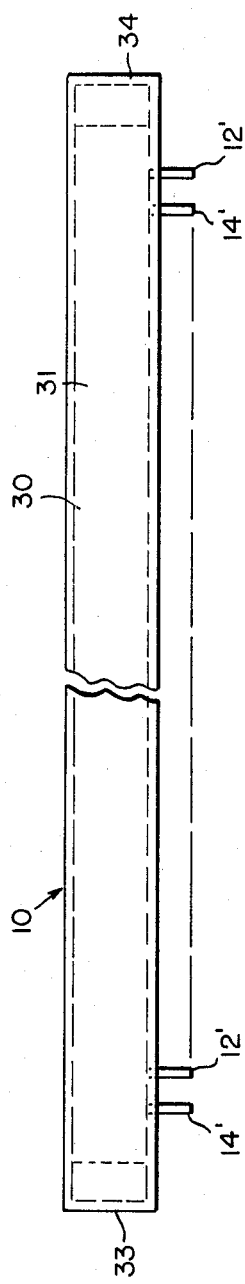
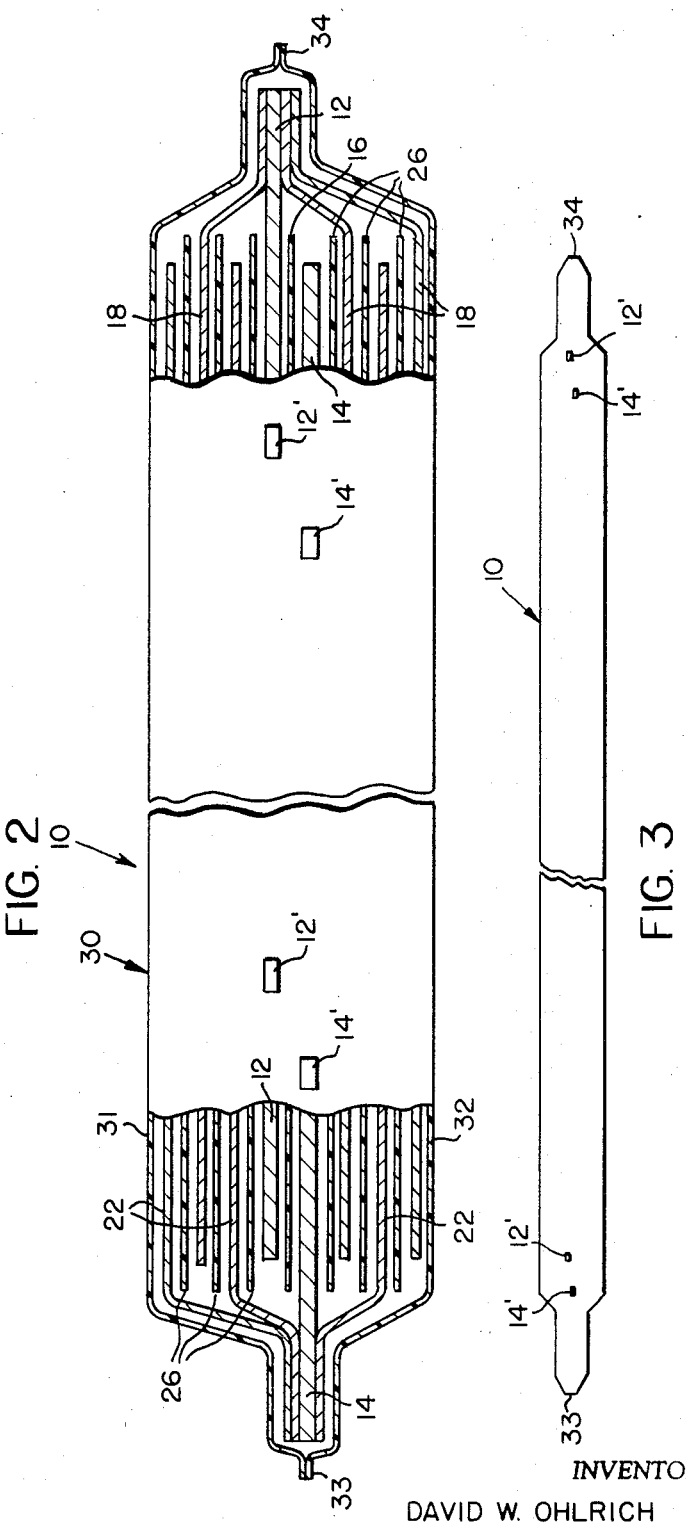
INVENTOR
DAVID W. OHLRICH
BY
ATTORNEY

United States Patent Office 3,520,987
Patented July 21, 1970

3,520,987
HIGH CAPACITY BUS BAR
David W. Ohlrich, Rochester, N.Y., assignor to Eldre Components, Inc., Rochester, N.Y., a corporation of New York
Filed Aug. 5, 1968, Ser. No. 750,200
Int. Cl. H01b 7/08
U.S. Cl. 174—117                                          5 Claims

ABSTRACT OF THE DISCLOSURE

Two primary conductors for voltage and ground, respectively, are laminated and bonded in an envelope with a plurality of thin foil secondary conductors. Some secondary conductors are connected at one end to one end of the positive primary conductor. Alternate secondary conductors are connected to the opposite end of the negative primary conductor. The other ends of both sets of secondary conductors are free. Thus, the conductors are interleaved. Thin layers of high dielectric constant insulation are provided between adjacent conductors. The primary conductors are thicker than the secondary conductors.

---

This invention relates to electrical bus bars, and more particularly to bus bars that are intended to be used in electrical transmission systems and printed circuit cards having extremely low characteristic impedance.

The transmission of power in computers, particularly as they become more complex in the number of individual electronic circuits that have to be supplied with electricity and in the demands for constantly higher speed of operation, requires that spurious signals or pulses generated within the system be suppressed and eliminated.

To reduce the effect of transient fluctuations, it has been common practice to use heavy conductors and by-pass capacitors connected at frequent intervals along the transmission line to the computer. Such lines, however, are bulky and expensive, and do not exhibit the low impedance, which is so desirable in computer circuits.

To obviate the objections to the heavy conductors and by-pass capacitors, bus bars have been devised consisting of laminated alternating flat conductor strips and insulation. Thus low inductance and high capacitance were achieved while obtaining the desired low impedance.

It is an object of this invention to provide an improved laminated type bus bar which has a low impedance, but is of greater capacitance for a given size.

Another object of the invention is to provide a bus bar having the desired greater capacitance and which will be extremely compact.

Other objects of the invention will be apparent hereinafter from the specification and from the recital of the appended claims, particularly when read in conjunction with the accompanying drawing.

In the drawing:

FIG. 1 is a fragmentary plan view of a laminated bus bar made in accordance with one embodiment of this invention;

FIG. 2 is a greatly enlarged, fragmentary side elevational view of this bar with parts thereof cut away and shown in section;

FIG. 3 is a fragmentary side elevation of the bus bar.

The present invention is a further step in the development of laminated bus bars to achieve higher capacitance. This is attained by providing a distributed capacitance through use of multiple strips of thin foil secondary conductors connected to the primary conductors and separated by thin layers of high dielectric constant insulation. The secondary conductors are electrically connected to the primary conductors at the bus ends or at any other place along the conductors. The individual components of the bus assembly are bonded into a unit under heat and pressure.

Referring now to the drawing by numerals of reference, 10 denotes a laminated bus bar comprising two elongate, parallel, flat primary conductors 12 and 14, for voltage and ground, respectively, for example.

Projecting from one longitudinal side edge of each primary conductor 12, 14 are a plurality of short, integral tabs or terminals 12', 14', respectively. These are the tie points by which individual circuits are interconnected. For different uses, these tie points are located to meet the specific requirements of a situation. The number of such tabs or terminals on each primary conductor, and the spacing between adjacent tabs or terminals of a conductor, are matters of choice depending upon the particular application for which the bus bar is designed.

The primary conductors 12 and 14 are separated by a layer 16 of dielectric insulation, which may be made, for example, from polyvinyl fluoride or the like.

A plurality of secondary conductors are secured at one end or along their edges by solder or other conducting media to the two primary conductors. The other ends of the secondary conductors are free. These secondary conductors are denoted at 18 and 22; and secondary conductors 18 alternate with secondary conductors 22. Primary conductor 12 is joined at one end of bar 10 to one end of secondary conductors 18; while primary conductor 14 is joined at its opposite end to one end of alternating secondary conductors 22.

The secondary conductors 18 and 22 comprise, for example, elongate strips of copper foil, or a like metal.

The interleaved overlapping secondary conductors are separated from one another, and from the primary conductors, by layers 26 of insulation, which may be made of the same material as the insulation 16. Each layer 16 and 26 of insulation is coated with an adhesive material, which is activated by heat and pressure, to bond together the superposed layers of conductors and insulators.

Secured around the outside of the superposed conductors 12, 14, 18 and 22, and the intervening insulators 16 and 26, is a plastic insulating jacket 30. Jacket 30 is made of two like opposed layers 31 and 32 of dielectric insulation, which are secured together around their perimeters, as at 33, 34. These layers provide a durable cover and seal for the inner components of the bus bar.

Each layer 31 and 32 may be a three-layer laminate made of "Amron No. 3" and consist of a polyester film and two outside layers of non-woven "Dacron" mat. Each layer 31 and 32 is impregnated with a heat and pressure-sensitive adhesive, so that by application of heat and pressure, the several layers will be fixed relative to one another and enclose and seal the inner components of the bus bar.

The layers of insulation 16 and 26 between adjacent conductors in the bar are, as stated coated with an adhesive activated by heat and pressure, and need be only thick enough to meet the voltage breakdown requirement of the circuits that are to be serviced by the bar; and usually these layers are .001 or .002 of an inch thick. The primary conductors 12 and 14 may be .010 of an inch or more thick; while the secondary conductors 18 and 22 may be approximately .002 of an inch or less thick. Consequently the overall conductor area for the bus bar, and consequently its capacitance is substantially large compared to its actual weight and size.

From the foregoing it will be apparent that the novel bus bar disclosed herein provides an improved transmission or trunk line having large low-resistance primary conductors, closely-spaced by a high dielectric material. In addition, the capacitance of the bus line is greatly increased by having interleaving, secondary conductors soldered to the primary conductors, and fully insulated from one another by intervening layers of polyvinylfluoride film insulating material. Since the bar 10 has an inherently low inductance, it therefore produces a low impedance, which is so desirable for applications in computer circuitry. The whole assembly is sealed in a durable outer covering, making a rugged, compact unit.

Although only two primary and six secondary conductors have been shown in the illustrated embodiment, it will be apparent to one skilled in the art that a greater number of primary and secondary conductors may be employed if desired. In practice this invention has been produced with twenty or more secondary conductors used in the manner illustrated. Moreover, although only four tabs or terminals 12' and 14' have been illustrated, it will be apparent that more such terminals may be employed on each of the primary conductors, depending upon the length of the conductors and the number of individual electronic circuits that are to be supplied with electricity.

When only two primray conductors 12 and 14 are employed, one of them may be, as already indicated, at ground potential, and the other may be connected to a regular power supply to supply the necessary voltage potential for the circuits serviced by the bus bar.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. An electrical bus bar comprising
    two primary electrical conductors,
    a first plurality of secondary electrical conductors, each of which is electrically connected at one point along its length to one of said primary conductors, but is separated therefrom along the rest of its length,
    a second plurality of secondary electrical conductors, each of which is electrically connected at one point along its length to the other of said primary conductors, but is separated from said other primary conductor along the remainder of its length,
    said secondary conductors alternating with one another and with said primary conductors, and
    a plurality of layers of dielectric material interposed between the said remaining portions of the lengths of said secondary conductors and between each primary conductor and the adjacent secondary conductors,
    said conductors being elongate, flat strips, and
    said primary conductors being substantially thicker than said secondary conductors.

2. A laminated electrical bus bar, comprising a first plurality of electrical conductor strips secured together at one end in electrical contact with each other, and having the opposite ends thereof disposed in superposed, spaced relation to one another,
    a second plurality of electrical conductor strips secured together at one end in electrical contact with each other, and having the opposite ends thereof disposed in superposed, spaced, alternating relation with said opposite ends of said first plurality of conductors, and
    a plurality of layers of insulating material interposed between said superposed ends of said conductors electrically to insulate said opposite ends thereof one from the other,
    certain of said strips being substantially thicker than others of said strips.

3. A laminated electrical bus bar as defined in claim 2, including
    a dielectric cover secured to and substantially surrounding said strips, and
    a plurality of integral terminals projecting out of said cover from at least one side edge of each of said certain strips.

4. A laminated electrical bus bar as defined in claim 3, wherein said certain strips comprise at least the two innermost of the conductors enclosed in said cover.

5. A laminated electrical bus bar as defined in claim 4 wherein at least two of said other strips are secured at one end to opposite sides respectively of each of said two innermost conductors, and extend at the opposite ends thereof for major portions of their lengths in spaced relation to said two innermost conductors.

References Cited

UNITED STATES PATENTS

| 1,684,491 | 9/1928 | Hoyt _____ 317—261 |
| 1,999,137 | 4/1935 | Flewelling _____ 317—261 X |
| 3,162,717 | 12/1964 | Lentz. |
| 3,264,403 | 8/1966 | Erdle. |

FOREIGN PATENTS

| 1,038,341 | 8/1966 | Great Britain. |

OTHER REFERENCES

Mullin W. F. Understanding Capacitors, The Bobbs Merrill Co. N.Y. 1961, pp. 34 and 35.

ELLIOT A. GOLDBERG, Primary Examiner

U.S. Cl. X.R.

174—35; 317—261